(12) United States Patent
Jogan (10) Patent No.: US 12,031,582 B2
(45) Date of Patent: Jul. 9, 2024

(54) PROTECTIVE COVER HAVING SENSOR HOLDER PART, BEARING DEVICE INCLUDING THE PROTECTIVE COVER, AND METHOD OF MANUFACTURING THE PROTECTIVE COVER HAVING THE SENSOR HOLDER PART

(71) Applicant: NAKANISHI METAL WORKS CO., LTD., Osaka (JP)

(72) Inventor: Yutaka Jogan, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 287 days.

(21) Appl. No.: 17/594,985

(22) PCT Filed: Feb. 14, 2020

(86) PCT No.: PCT/JP2020/005743
§ 371 (c)(1),
(2) Date: Nov. 4, 2021

(87) PCT Pub. No.: WO2020/235151
PCT Pub. Date: Nov. 26, 2020

(65) Prior Publication Data
US 2022/0307553 A1  Sep. 29, 2022

(30) Foreign Application Priority Data
May 20, 2019  (JP) ................. 2019-094729

(51) Int. Cl.
*F16C 33/72* (2006.01)
*B60B 27/00* (2006.01)
*F16C 41/00* (2006.01)

(52) U.S. Cl.
CPC ........ *F16C 33/723* (2013.01); *B60B 27/0068* (2013.01); *F16C 41/007* (2013.01);
(Continued)

(58) Field of Classification Search
CPC .. F16C 33/723; F16C 41/007; F16C 2220/04; F16C 2220/06; F16C 2233/00; F16C 2326/02; B60B 27/0068; B60B 27/0073
See application file for complete search history.

(56) References Cited

U.S. PATENT DOCUMENTS

2017/0001471 A1\* 1/2017 Fukuda ............... F16C 33/7833
2018/0354171 A1\* 12/2018 Sankai .................. F16C 19/186

FOREIGN PATENT DOCUMENTS

| JP | 63216719 A | 9/1988 |
| JP | 06166064 A | 6/1994 |

(Continued)

OTHER PUBLICATIONS

International Search Report dated Mar. 24, 2020 from PCT Application No. PCT/JP2020/005743.
(Continued)

*Primary Examiner* — Alan B Waits
(74) *Attorney, Agent, or Firm* — INNOVATION CAPITAL LAW GROUP, LLP; Vic Lin (57) ABSTRACT

The protective cover having a cup shape is mounted to an outer ring of a bearing so as to seal an inward-side end portion of the bearing. A protective cover includes: a disc part made of a synthetic resin; and a sensor holder part that is made of the synthetic resin and protrudes inward from the disc part. The disc part is provided with a separation wall which separates the magnetic encoder and the magnetic sensor from each other. The separation wall has a surface facing the magnetic encoder and a surface facing the magnetic sensor, and one of the surfaces has a mark of a gas drainage pin of an injection molding die.

6 Claims, 6 Drawing Sheets

(52) U.S. Cl.
CPC ...... *F16C 2220/04* (2013.01); *F16C 2233/00* (2013.01); *F16C 2326/02* (2013.01)

(56) References Cited

FOREIGN PATENT DOCUMENTS

| | | |
|---|---|---|
| JP | 6345040 A | 2/1998 |
| JP | 2004354066 A | 12/2004 |
| JP | 2016156493 A | 9/2016 |
| JP | 2016170001 A | 9/2016 |
| JP | 2017015246 A | 1/2017 |
| WO | 2011093265 A1 | 8/2011 |

OTHER PUBLICATIONS

Extended European Search Report dated Dec. 21, 2022 from European Application No. 20809031.6.

* cited by examiner

PROTECTIVE COVER HAVING SENSOR HOLDER PART, BEARING DEVICE INCLUDING THE PROTECTIVE COVER, AND METHOD OF MANUFACTURING THE PROTECTIVE COVER HAVING THE SENSOR HOLDER PART

TECHNICAL FIELD

The present invention relates to a cup-shaped protective cover that is mounted to an outer ring of a bearing so as to cover a magnetic encoder, and in particular to a protective cover having a sensor holder part that holds a magnetic sensor. Further in particular, the present invention relates to a protective cover having a separation wall between the magnetic encoder and the magnetic sensor.

BACKGROUND ART

In automobiles, anti-lock braking systems are widely used for providing efficient and safe braking through prevention of locking of wheels. In the anti-lock braking systems, the rotation speed of each wheel is detected by a rotation speed detection device (wheel speed sensor), the acceleration and the deceleration are calculated by a control device, the vehicle body speed and the slip ratio are estimated, and on the basis of the result, an actuator is driven to control the brake fluid pressure, for example.

Bearing devices each including such a rotation speed detection device provided at a rolling bearing (hub bearing) for supporting a wheel of an automobile are also widely used. In such a bearing device, a magnetic encoder in which N poles and S poles are alternately arranged at regular intervals in the circumferential direction is mounted to an inner ring at one end portion in the axial direction of the bearing, and a cup-shaped protective cover is mounted to an outer ring at the one end portion in the axial direction of the bearing so as to seal the bearing (see Patent Literature 1, for example).

The protective cover of the invention described in Patent Literature 1 has a sensor holder part that holds a magnetic sensor opposite to the magnetic encoder, and a separation wall (bottom portion 22a) between the magnetic encoder and the magnetic sensor.

CITATION LIST

Patent Literature

Patent Literature 1: Japanese Unexamined Patent Application Publication No. 2016-170001
Patent Literature 2: International Patent Application Publication No. WO2011/093265

SUMMARY OF INVENTION

Technical Problem

In the protective cover having the sensor holder part, the separation wall provided between the magnetic encoder and the magnetic sensor has the thickness set, e.g., in Patent Literature 1, to 0.1 to 1.0 mm from the viewpoint of improving the detection accuracy of the magnetic sensor while maintaining the strength and the rigidity of the separation wall (see the description in paragraph 0042 of Patent Literature 1).

The thinner the thickness of the separation wall is set, the more the detection accuracy of the magnetic sensor is improved. Here, considering the moldability and so on upon molding through injection molding, the thickness is set at a level of 0.3 to 1.0 mm.

In a protective cover having a sensor holder part as the invention of Patent Literature 1, relative difference between the thickness of the main body and the thickness of the separation wall is large. In addition, the protective cover is often molded through the injection molding using a fiber-reinforced resin including a glass fiber-reinforced polyamide resin, and so on. Accordingly, a weld (a merging portion of a molten resin material) is generated in the separation wall, when the molten resin material is charged into a cavity of a die.

If a weld is generated in a thin separation wall, air in a cavity of an injection molding die is easily accumulated in the separation wall. If the air is not discharged outside the die, burning or short shot may be caused (see Patent Literature 2, for example).

Here, the burning is a phenomenon in which if a molten resin material flowing into the cavity of the injection molding die causes the air in the cavity, having no place to go, to be closed in a blocked state, the compressed air is self-heated and burns to cause the molten resin material to be burned. The short shot is a phenomenon in which an air is accumulated and thus causes uncomplete charging to occur in a part of a molded article.

The occurrence of the burning or the short shot in a separation wall causes poor appearance of the separation wall or defectiveness including underfill, and/or defectiveness that causes the rigidity and strength of the separation wall to decrease, lowering the non-defective rate of a protective cover having a sensor holder part.

Furthermore, if the burning occurs, air combustion is induced, and a molten resin material is burned. This generates soot and tar which adhere to a die. This causes a maintenance interval of the die that is used to mold a protective cover having a sensor holder part to be shortened.

In order to prevent the burning or the short shot from occurring on the separation wall, it is conceivable that an ejector pin for protruding a molded article is provided at a position, in the injection molding die, at which the separation wall is molded so as to allow the ejector pin to have a gas drainage function.

Such an ejector pin having the gas drainage function may be provided in the injection molding die. In such a case, since the separation wall is as thin as about 0.3 to 1.0 mm, the separation wall may be broken upon the protrusion of the molded article. This lowers the non-defective rate of the protective cover having the sensor holder part.

Examples of the ejector pin having the gas drainage function include an ejector pin having, on the outer periphery thereof, a gas vent as shown in FIG. 3 of Patent Literature 2, an ejector pin having, at the distal end thereof, a gas vent piece as shown in FIG. 4 of Patent Literature 2, and so on.

In view of the above, an object of the present invention is to prevent, in a protective cover having a sensor holder part and a separation wall between a magnetic encoder and a magnetic sensor, defectiveness due to burning or short shot from occurring on the separation wall, without lowering the non-defective rate of the protective cover.

Solution to Problem

The summary of the present invention is as follows.

[1] A protective cover having a cup shape, for use in a bearing device, the bearing device including:
a bearing including: an inner ring having, on an outer peripheral surface thereof, an inner ring raceway surface; an outer ring having, on an inner peripheral surface thereof, an outer ring raceway surface; and a rolling element rolling between the inner ring raceway surface and the outer ring raceway surface;
a magnetic encoder including N poles and S poles, which are alternately arranged at regular intervals in a circumferential direction, the magnetic encoder being located at an inward-side end portion of the bearing and fixed to the inner ring; and
a magnetic sensor being opposed to magnetic poles of the magnetic encoder, for detecting rotation of the magnetic encoder,
the protective cover being mounted to the outer ring so as to seal the inward-side end portion of the bearing,
the protective cover including:
a disc part made of a synthetic resin; and
a sensor holder part made of the synthetic resin and protruding inward from the disc part;
the disc part having a separation wall which separates the magnetic encoder and the magnetic sensor from each other, and
the separation wall has a surface facing the magnetic encoder and a surface facing the magnetic sensor, and one of the surfaces has a mark of a gas drainage pin of an injection molding die.

[2] The bearing device provided with the protective cover having the sensor holder part, according to the above [1].

[3] A method of manufacturing a protective cover having a cup shape, for use in a bearing device, the bearing device including:
a bearing including: an inner ring having, on an outer peripheral surface thereof, an inner ring raceway surface; an outer ring having, on an inner peripheral surface thereof, an outer ring raceway surface; and a rolling element rolling between the inner ring raceway surface and the outer ring raceway surface;
a magnetic encoder including N poles and S poles, which are alternately arranged at regular intervals in a circumferential direction, the magnetic encoder being located at an inward-side end portion of the bearing and fixed to the inner ring; and
a magnetic sensor being opposed to magnetic poles of the magnetic encoder, for detecting rotation of the magnetic encoder,
the protective cover being mounted to the outer ring so as to seal the inward-side end portion of the bearing,
the protective cover including:
a disc part made of a synthetic resin; and
a sensor holder part made of the synthetic resin and protruding inward from the disc part;
the disc part having a separation wall which separates the magnetic encoder and the magnetic sensor from each other,
the protective cover being molded using an injection molding die, the injection molding die including:
a mechanism by which a molded article is protruded; and
a gas drainage pin at a position where the separation wall is molded,
the method comprising:
an injection molding step of closing the injection molding die and injecting a molten resin material through a gate into a cavity of the injection molding die to solidify the molten resin material; and
a molded-article taking out step of opening the injection molding die and protruding the protective cover that is the molded article, using the mechanism by which the molded article is protruded, so as to take the protective cover out.

[4] The manufacturing method of a protective cover having a sensor holder part, according to the above [3], in which the gas drainage pin protrudes in the cavity of the injection molding die, and slidably moves back to an original position after the protrusion, and
the gas drainage pin enters the cavity after the mechanism by which the molded article is protruded is operated, so as to be prevented from pressing the separation wall due to the entering.

[5] The manufacturing method of a protective cover having a sensor holder part, according to the above [3] or [4], in which the gas drainage pin provided at a position, in the injection molding die, where the separation wall is molded, is located at a merging portion of the molten resin material, the merging portion having been obtained by a resin fluidity analysis that has been previously performed.

Advantageous Effects of Invention

According to the aforementioned protective cover having a sensor holder part, the bearing device including the protective cover, and the method of manufacturing the protective cover having the sensor holder part, effects as shown below are mainly obtained.

(1) When a protective cover having a sensor holder part and a separation wall between a magnetic encoder and a magnetic sensor is manufactured, air in a cavity of an injection molding die, which accumulates at a position where the separation wall is molded during injection molding, is discharged to the outside of the die through a gas drainage pin provided at the position where the separation wall of the injection molding die is molded. Accordingly, no burning and/or short shot occurs at the separation wall of the protective cover of the protective cover that is molded by the injection molding.

(2) Therefore, poor appearance of the separation wall or defectiveness including underfill, and/or defectiveness causing the rigidity and the strength of the separation wall to be decreased are not induced. Therefore, non-defective rate of the protective cover having a sensor holder part is not lowered.

(3) Furthermore, since no burning occurs, no air combustion is induced, either. Accordingly, a molten resin material is not burned and no soot and no tar adhere to the injection molding die. Therefore, a maintenance interval of the injection molding die that is used for molding a protective cover having a sensor holder part can be elongated.

BRIEF DESCRIPTION OF DRAWINGS

FIGS. 6A to 6E show that the charging of the molten resin material progresses, and FIG. 6E shows the state where the charging is completed.

DESCRIPTION OF EMBODIMENTS

The present invention will be described in further detail with reference to embodiments shown in the attached drawings.

Herein, the direction of the rotation axis of a bearing device A is referred to as "axial direction", and the direction orthogonal to the axial direction is referred to as "radial direction".

Figure 1:
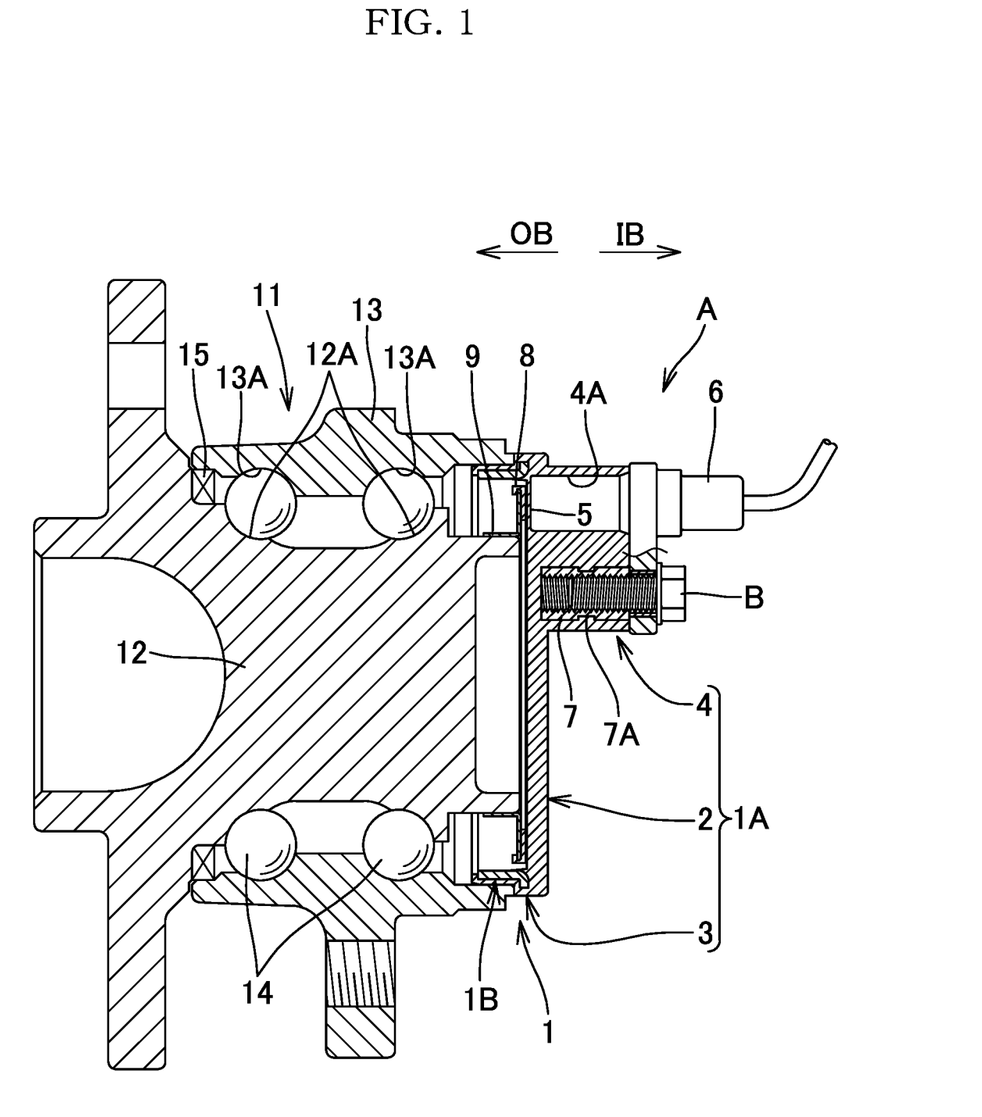
FIG. 1 is a vertical cross-sectional view of a bearing device provided with a protective cover having a sensor holder part, according to an embodiment of the present invention.
Figure 4:
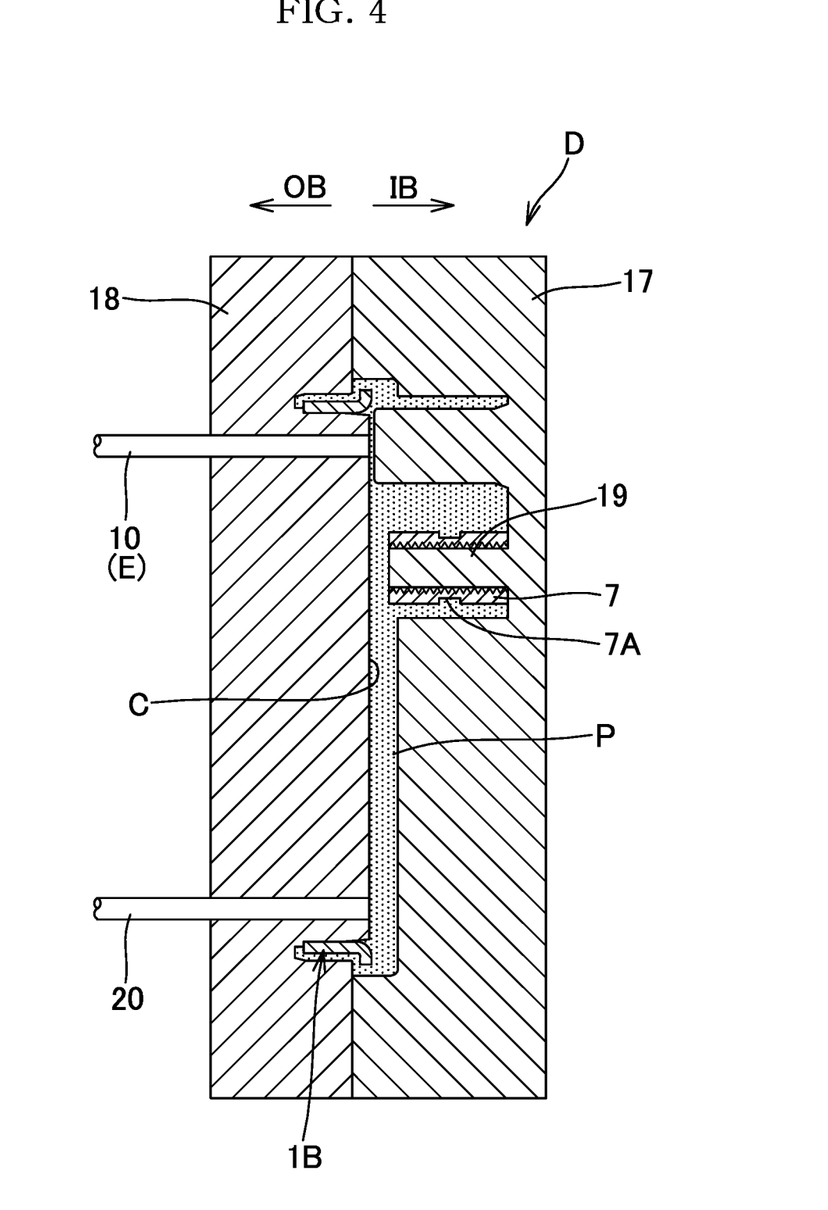
FIG. 4 is a vertical cross-sectional view of the injection molding die for molding the protective cover having the sensor holder part, according to the embodiment of the present invention.
Figure 5:
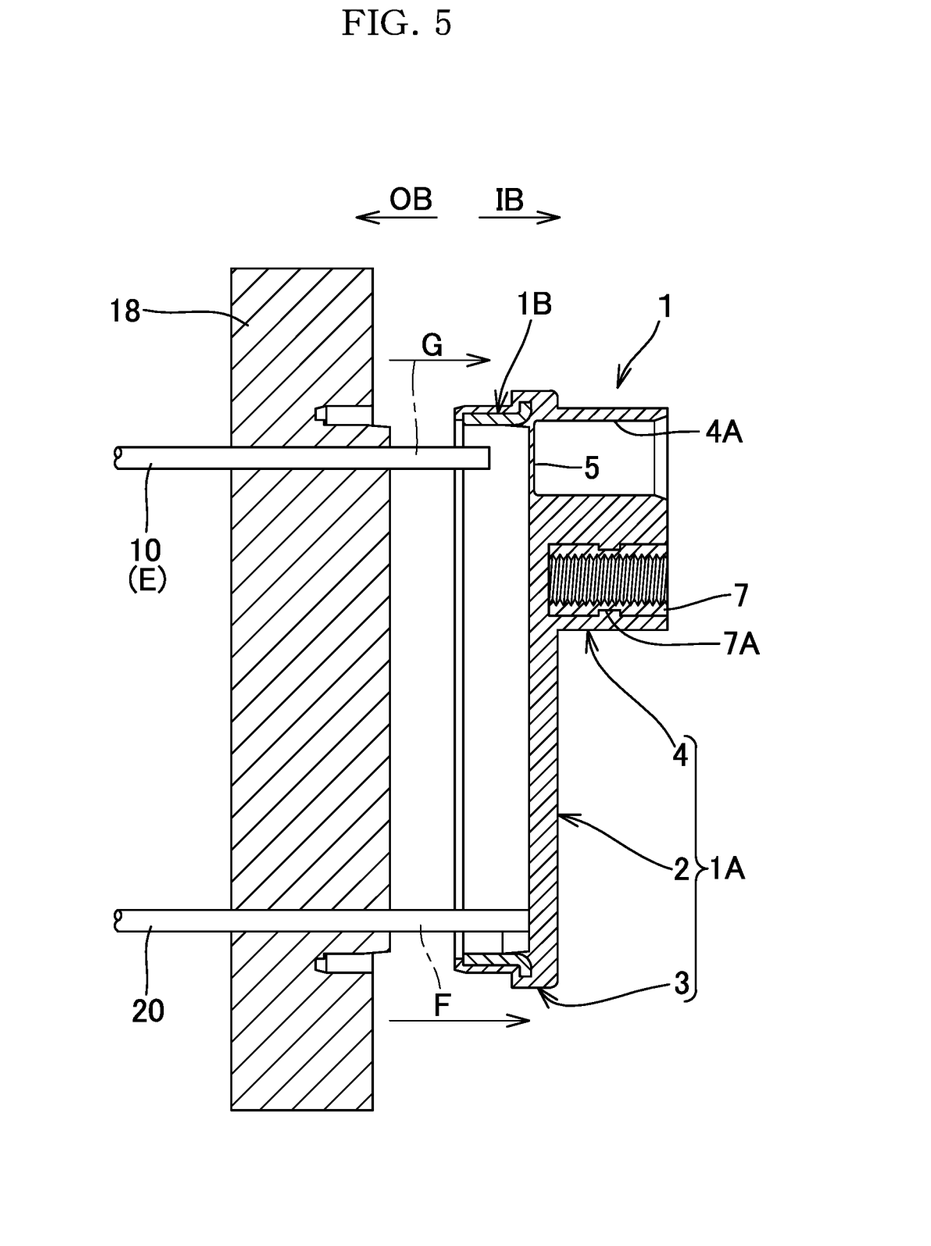
FIG. 5 is a vertical cross-sectional view of a state in which a movable ejector pin is protruded.

With respect to a bearing 11 and a protective cover 1, in a state where the protective cover 1 is attached to the bearing 11, the direction (outboard) parallel to the axial direction and extending from the vehicle body of an automobile toward the wheel side is defined as "outward" (see the arrow OB in FIG. 1, FIG. 4, and FIG. 5), and the direction (inboard) parallel to the axial direction and extending from the wheel of an automobile toward the vehicle body side is defined as "inward" (see the arrow IB in FIG. 1, FIG. 4, and FIG. 5).

<Bearing Device>

As shown in a vertical cross-sectional view of FIG. 1, the bearing device A according to an embodiment of the present invention includes: the bearing 11 in which an inner ring 12 rotates with respect to an outer ring 13; a magnetic encoder 8; the protective cover 1; a magnetic sensor 6; a sealing member 15 disposed at an outward-side (see the arrow OB) end portion of the bearing 11; and so on.

The bearing 11 includes: the inner ring 12 having, on the outer peripheral surface thereof, an inner ring raceway surface 12A; the outer ring 13 having, on the inner peripheral surface thereof, an outer ring raceway surface 13A; rolling elements 14 which roll between the inner ring raceway surface 12A and the outer ring raceway surface 13A; and so on.

The magnetic encoder 8 includes N poles and S poles which are alternately arranged at regular intervals in the circumferential direction. The magnetic encoder 8 is fixed to the inner ring 12 by a support member 9 located at an inward-side (see the arrow IB) end portion of the bearing 11.

The protective cover 1 has a cup shape, is mounted to the outer ring 13 so as to seal the inward-side end portion of the bearing 11, and has a sensor holder part 4 which holds the magnetic sensor 6.

The magnetic sensor 6 attached to the sensor holder part 4 of the protective cover 1 is opposite to the magnetic encoder 8 with a separation wall 5 interposed therebetween, and detects rotation of the magnetic encoder 8. The separation wall 5 has a thickness at a level of 0.3 to 1.0 mm.

The protective cover 1 has the separation wall 5 but does not have a through hole penetrating the protective cover 1 in the thickness direction thereof. Thus, there is no need to incorporate a sealing member such as an O-ring.

In addition, the inward-side end portion of the bearing 11 is sealed by the protective cover 1, thereby preventing pebbles, muddy water, and the like from colliding with the magnetic encoder 8. This prevents the magnetic encoder 8 from being broken.

Further, the inward-side end portion of the bearing 11 is sealed by the protective cover 1, so that no sealing member is needed at the inward side of the magnetic encoder 8. This reduces the sliding resistance, thereby also reducing the running torque of the bearing 11.

Still further, the protective cover 1 is provided with the sensor holder part 4, thereby eliminating the trouble in adjusting airgap between the magnetic encoder 8 and the magnetic sensor 6.

<Protective Cover>

Figure 2A:
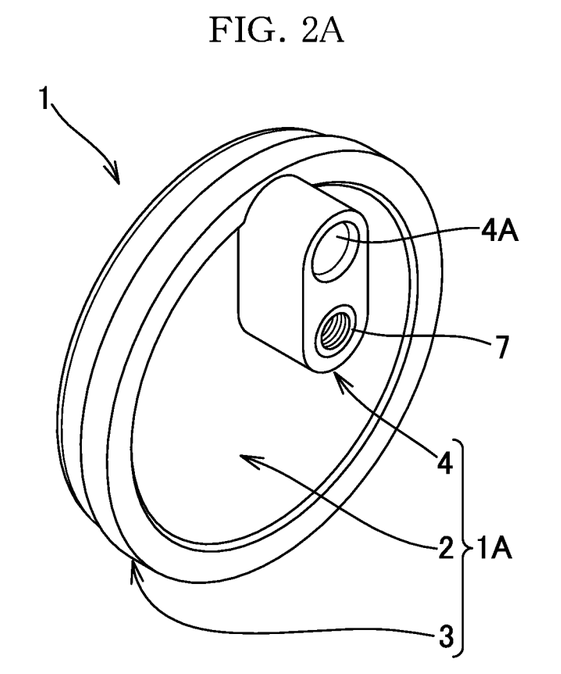
FIG. 2A is a perspective view of the protective cover having the sensor holder part, which is seen from the inward side, according to the embodiment of the present invention.
Figure 2B:
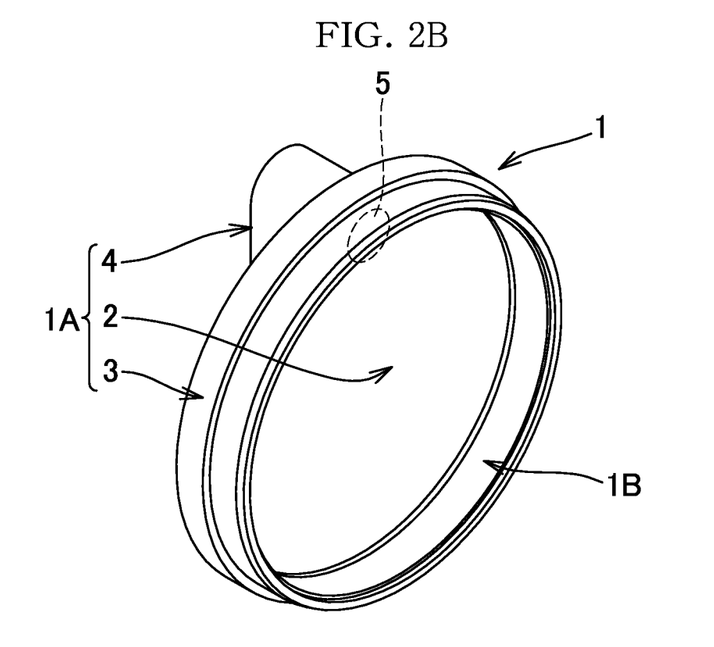
FIG. 2B is a perspective view of the protective cover having the sensor holder part, which is seen from the outward side, according to the embodiment of the present invention.

As shown in the vertical cross-sectional view of FIG. 1 and the perspective views in FIGS. 2A and 2B, the protective cover 1 according to the embodiment of the present invention includes a fiber-reinforced synthetic resin main body 1A and a metal annular body 1B, which are integrally formed through insert injection molding of a resin and a metal.

The fiber-reinforced synthetic resin for molding the main body 1A may include a synthetic resin, such as polyamide (nylon 6, nylon 66, nylon 612, or the like), polyphenylene sulfide (PPS), or polybutylene terephthalate (PBT), and 20 to 70% by weight of glass fiber contained in the synthetic resin, for example.

For the metal annular body 1B, it is preferable to use a cold-rolled steel plate, such as SPCC, which is a low carbon steel.

The main body 1A includes a disc part 2 and a cylindrical part 3 which form a cup shape, and the sensor holder part 4 protruding inward from the disc part 2.

The sensor holder part 4 holds a nut 7 that is, for example, made of brass and is screwed with a mounting bolt B for mounting the magnetic sensor 6. The sensor holder part 4 has a sensor mounting hole 4A into which the magnetic sensor 6 is inserted.

In the disc part 2, the separation wall 5 thinner than other portions of the disc part 2 is formed. The separation wall 5 separates the magnetic encoder 8 and the magnetic sensor 6 from each other. The separation wall 5 has a surface (the outward surface) facing the magnetic encoder 8, on which a gas-drainage pin mark M is present, as shown in the major-part enlarged views of FIGS. 3A and 3B.

The gas-drainage pin mark M remains in the protective cover 1 without fail due to the fact that the protective cover 1 is manufactured through a manufacturing method described later. The gas-drainage pin mark M can be recognized visually.

Figure 3A:
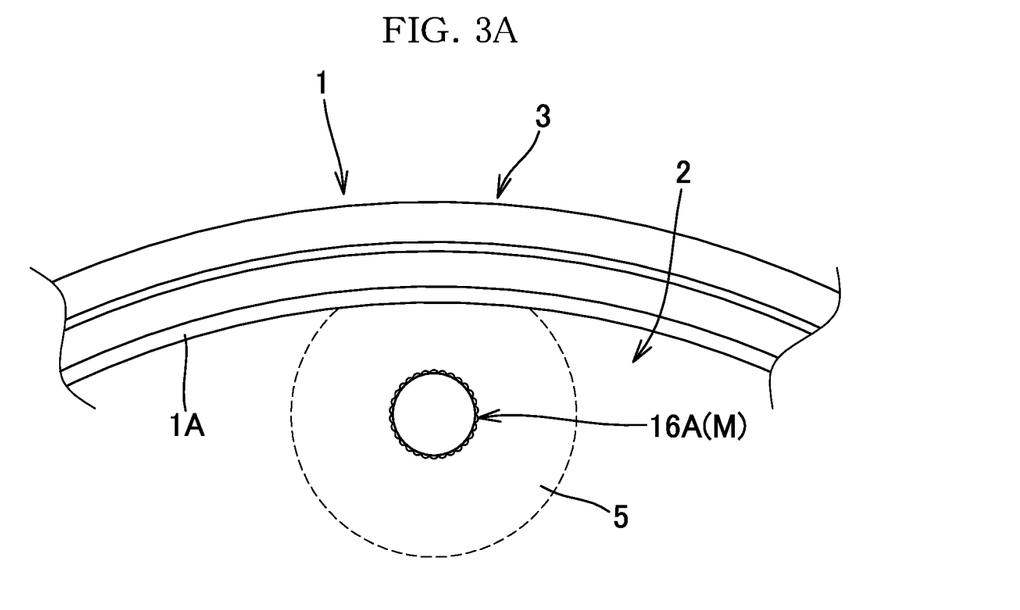
FIG. 3A is a major-part enlarged view of an example of a mark of a gas drainage pin of an injection molding die, which is formed on a surface, of a separation wall, facing a magnetic encoder.
Figure 3B:
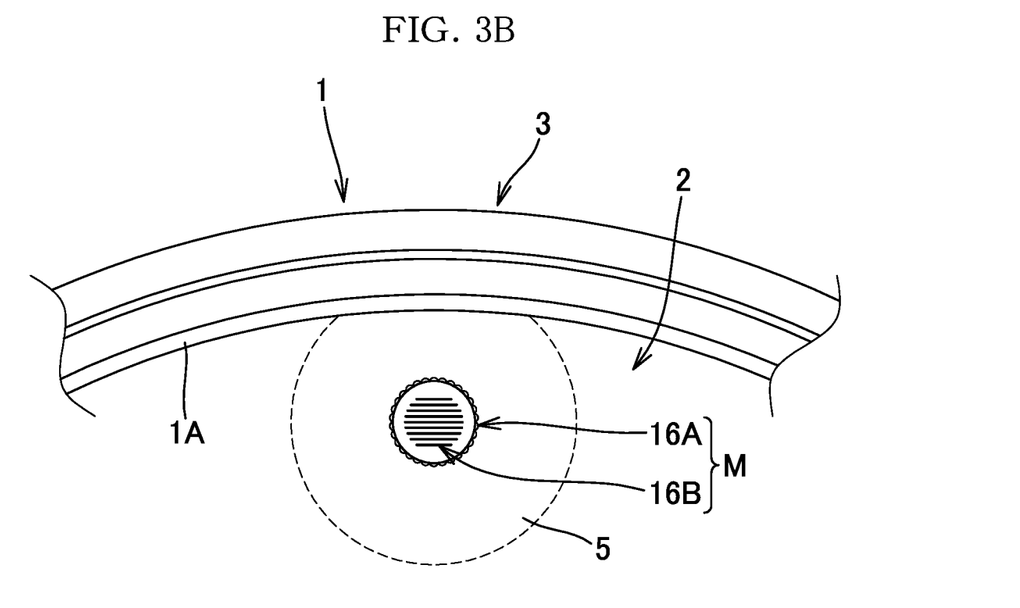
FIG. 3B is a major-part enlarged view of another example of the mark of the gas drainage pin of the injection molding die, which is formed on the surface, of the separation wall, facing the magnetic encoder.

The gas-drainage pin mark M may be present at a surface of the separation wall 5, which is a surface opposite to the surface shown in FIGS. 3A and 3B, i.e., a surface of the separation wall 5 (the inward surface) that faces the magnetic sensor 6, depending on the position of a gas drainage pin provided in the injection molding die. Even in such a case, the gas-drainage pin mark M can be recognized visibly.

The gas-drainage pin mark M shown in FIG. 3A is tiny burrs 16A on the outer periphery of a gas drainage pin. The gas-drainage pin mark M corresponds to a mark that is made when a pin 10 having a gas drainage function and corresponding to a gas drainage pin E (described later) has a configuration similar to that of an ejector pin or the like, which is provided with a gas vent on the outer periphery thereof, as shown in FIG. 3 of Patent Literature 2.

The gas-drainage pin mark M shown in FIG. 3B includes the tiny burrs 16A on the outer periphery of a gas drainage pin, and slot marks 16B. The gas-drainage pin mark M corresponds to a case in which the pin 10 that has the gas drainage function and corresponds to a mark that is made when the gas drainage pin E (described later) has a configuration similar to that of the ejector pin or the like which is provided with a gas vent piece embedded at the distal end of the ejector pin, as shown in FIG. 4 of Patent Literature 2.

<Method of Manufacturing Protective Cover>

Next, a method of manufacturing the protective cover 1 shown in FIGS. 2A and 2B is described with reference to vertical cross-sectional views in FIGS. 4 and 5.

(Injection Molding Die)

As shown in the vertical cross-sectional view of FIG. 4, the injection molding die D includes a fixed die 17 and a movable die 18. The injection molding die D is provided with a pin 10 that is the gas drainage pin E and has the gas drainage function at a position where the separation wall 5 is molded, in addition to an ejector pin 20 that constitutes a mechanism of protruding a molded article.

The pin 10 protrudes in the cavity C of the injection molding die D, and can slide back to the original position after the protrusion.

The pin 10 having the gas drainage function has a configuration similar to that of the ejector, which is pin provided, on the outer periphery thereof, the gas vent as shown in FIG. 3 of Patent Literature 2, or a configuration similar to the ejector pin having, at the distal end thereof, the gas vent piece as shown in FIG. 4 of Patent Literature 2, for example.

The pin 10 having the gas drainage function has a columnar shape with the diameter of 0.5 mm or more, preferably 1 mm or more, more preferably 2 mm or more, and equal to or less than the diameter of the magnetic sensor 6 (the diameter of the sensor mounting hole 4A), for effectively performing the gas drainage.

Typical ejector pins have the gas drainage function at a certain level. Thus, such typical ejector pins may be used as the pin 10 having the gas drainage function, depending on the required specification and the like. If the typical ejector pin is used, the gas drainage is performed by allowing gas to pass through a gap between a hole of the mold die and the pin.

(Injection Molding Step)

Before the molten resin material P is injected into the cavity C of the injection molding die D shown in the vertical cross-sectional view of FIG. 4, the injection molding die D is opened. Then, the nut 7 that is an insert article is set to the support shaft 19 of the fixed die 17, and the metal annular body 1B that is an insert article is set to the movable die 18. Then, the injection molding die D mounted to the injection molding machine is clamped.

Next, as shown in the vertical cross-sectional view of FIG. 4, the molten resin material P is charged from a gate (not shown) into the cavity C of the injection molding die D.

In the protective cover 1 according to the present embodiment, when the molten resin material P is charged in the cavity C of the injection molding die D, a weld (a merging portion of the molten resin material P) is generated in the separation wall 5.

Air in the cavity, which accumulates at a position where the separation wall 5 is molded during the injection molding, is discharged outside the die through the pin 10 that is the gas drainage pin E and has the gas drainage function.

Accordingly, no burning and/or short shot occurs at the separation wall 5 of the protective cover 1 that is a molded article formed through the injection molding step.

Therefore, poor appearance of the separation wall 5 or underfill and such defectiveness, and/or defectiveness of decreasing in the rigidity and the strength of the separation wall are not induced. Therefore, non-defective rate of the protective cover 1 having the sensor holder part 4 is not lowered.

Furthermore, since no burning occurs, no air combustion is induced, either. Accordingly, the molten resin material P is not burned and no soot and no tar adhere to the injection molding die D. Therefore, a maintenance interval of the injection molding die D that is used for molding the protective cover 1 having the sensor holder part 4 can be elongated.

(Molded Article Taking-Out Step)

Next, after the molten resin material P is cooled and solidified, the movable die 18 is opened. The protective cover 1 that is a molded article is positioned in the movable die 18.

As shown in vertical cross-sectional view of FIG. 5, the ejector pin 20 is protruded along the arrow F. Thus, the protective cover 1 that is a molded article positioned in the movable die 18 is taken out.

Although the number of the ejector pin 20 shown in the vertical cross-sectional view of FIG. 5 is only one, the movable die 18 is provided with the desired number of the ejector pins 20.

When the ejector pin 20 is protruded along the arrow F as shown in vertical cross-sectional view of FIG. 5, the pin 10 having the gas drainage function moves, after the ejector pin 20 moves, in the direction as shown by the arrow G, along which the ejector pin 20 also moves. Accordingly, the pin 10 having the gas drainage function does not press the separation wall 5.

Therefore, the movement of the pin 10 having the gas drainage function does not damage the separation wall 5, so that non-defective rate of the protective cover 1 having the sensor holder part 4 is not lowered.

In addition, the pin 10 having the gas drainage function moves from the movable die 18 in the direction along the arrow G in FIG. 5, and then moves back to the position shown in FIG. 4. This movement provides a function of cleaning a slidable portion between the movable die 18 and the pin 10 as well as a gap (circumferential groove) between the pin 10 and the surface of the movable die 18, which faces the cavity C.

In the protective cover 1 that is manufactured through the above-described insert injection molding and has the sensor holder part 4, a synthetic resin enters a peripheral groove 7A of the nut 7, thereby preventing the nut 7 from coming off.

In addition, the cylindrical part 3 wraps around the outward-side (see the arrow OB in FIG. 5) end portion of the metal annular body 1B, thereby allowing the metal annular body 1B and the fiber-reinforced synthetic resin main body 1A to be mechanically coupled with each other.

Furthermore, after the protective cover 1 having the sensor holder part 4 undergoes the injection molding step, a mark M of the gas drainage pin E shown in FIG. 3A or FIG. 3B remains at a surface (outward surface) of the separation wall 5, which faces the magnetic encoder 8.

The gas drainage pin E to be provided at a position where the separation wall 5 is molded in the injection molding die D may be provided in the fixed mold 17. In such a case, the mark M of the gas-drainage pin E remains at a surface of the separation wall 5, which is opposite to the surface of the separation wall 5, as shown in FIGS. 3A and 3B, i.e., a surface (inward surface) that faces the magnetic sensor 6.

The mark M of the gas-drainage pin E, which is shown in FIG. 3A, corresponds to a mark that is made when the gas drainage pin E is the pin 10 having the gas drainage function, and has a configuration similar to that of the ejector pin provided, on the outer periphery thereof, with the gas vent as shown in FIG. 3 of Patent Literature 2. In this case, tiny burrs 16A corresponding to a gap between the pin 10 having the gas drainage function and the injection molding die D (the movable die 18 in the present embodiment) is generated, and becomes the mark M of the gas drainage pin E. The mark can be visibly recognized.

The inward part of the tiny burrs 16A in the radial direction has a slightly-recessed concave shape or a slightly-projected convex shape, depending on the location accuracy of the pin 10 having the gas drainage function in the direction along which the pin 10 moves back and forth, upon setting the pin 10 in the die.

The mark M of the gas-drainage pin E shown in FIG. 3B corresponds to a mark that is made when the gas drainage pin E is the pin 10 having the gas drainage function and has a configuration similar to that of the ejector pin or the like, which is provided, at the distal end thereof, with the gas vent piece as shown in FIG. 4 of Patent Literature 2. In this case, the tiny burrs 16A corresponding to a tiny gap between the pin 10 having the gas drainage function and the injection molding die D (the movable die 18 in the present embodiment) is generated, and the slot marks 16B of the gas vent piece remain. The remaining slot marks 16B become the mark M of the gas-drainage pin E, which can be visibly recognized.

The inward part of the tiny burrs 16A in the radial direction has a slightly-recessed concave shape or a slightly-projected convex shape, depending on the location accuracy of the pin 10 having the gas drainage function in the direction along which the pin 10 moves back and forth, upon setting the pin 10 in the die.

<Analysis of Resin Fluidity for Determining Setting Position of Gas Drainage Pin>

With respect to filling a space in the die for molding the separation wall 5 with the molten resin material P in an example of the injection molding die D used for molding the protective cover 1 according to the present embodiment, "Simulation Moldflow" that is a simulation tool for plastic injection molding was used to perform the resin fluidity analysis under the following analysis conditions. The results of the analysis are shown in FIG. 6.

(Analysis Condition)

The material data of the fiber-reinforced synthetic resin was PA66 and 50% by weight of glass fiber that has been added to the PA66. The injection flow rate was 70 mm$^3$/s. As the molding conditions, the resin temperature was set to 300° C., and the die temperature was set to 95° C.

A gate position was set to a lower-right portion in each of the drawings of FIG. 6A to FIG. 6E, and the thickness of the separation wall 5 was set to 0.6 mm.

Figure 6A:
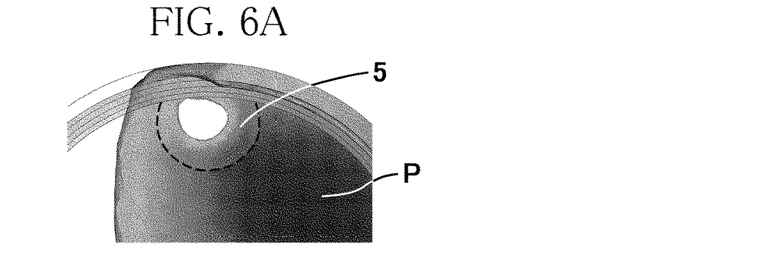
FIGS. 6A to 6E are diagrams respectively showing results of resin-flow analysis, i.e., a state in which a molten resin material is charged into a part for molding the separation wall from the outer periphery of the die.
Figure 6B:
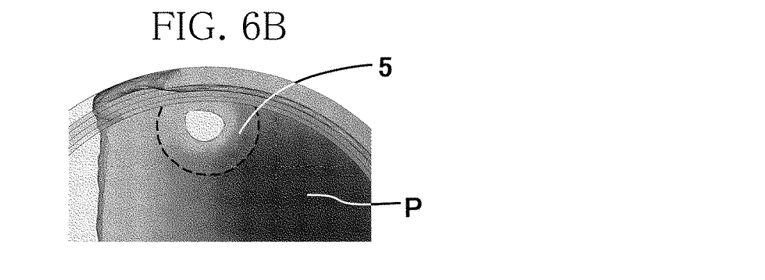
Figure 6C:
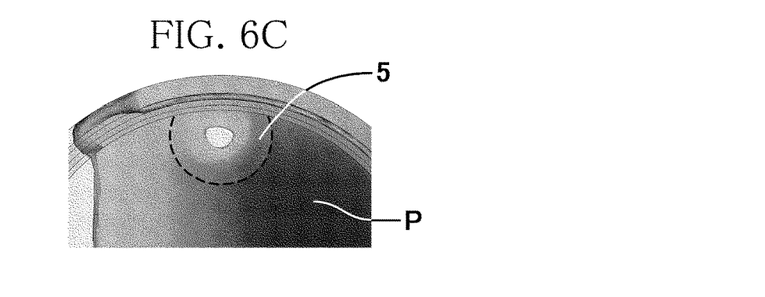
Figure 6D:
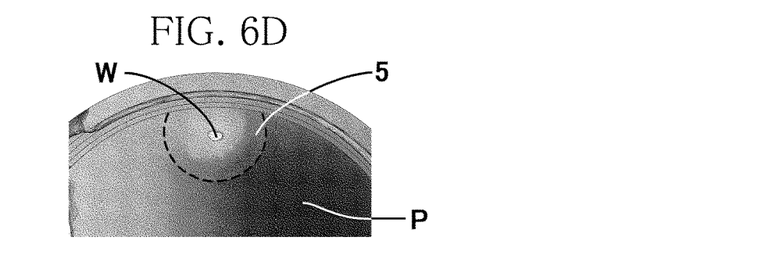
Figure 6E:
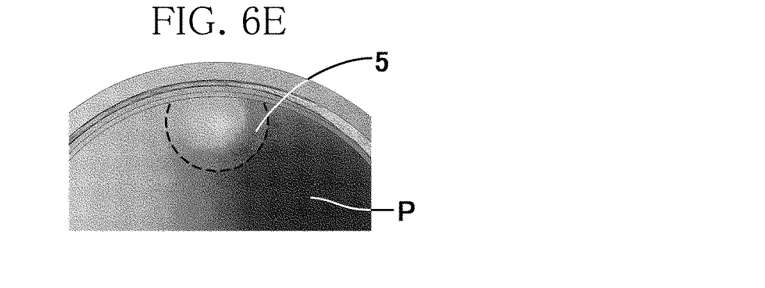

FIGS. 6A to 6E show a state in which the charging of the molten resin material P progresses, and FIG. 6E shows a state in which the charging of the molten resin material P is completed.

In shades in drawings of FIGS. 6A to 6E, dark areas show portions where the material was charged earlier.

Such resin fluidity analysis is performed to reveal the position of the weld (merging portion of the molten resin material P) W from FIG. 6D, for example.

Accordingly, the gas drainage pin E to be provided at a position where the separation wall 5 is molded in the injection molding die D may be placed at the merging portion W of the molten resin material P, which is found through the resin fluidity analysis previously performed.

Therefore, when the molten resin material P is injected in the cavity C of the injection molding die D during the injection molding step, air inside the cavity C, which is accumulated toward the merging portion W of the molten resin material P can be efficiently discharged through the gas drainage pin E placed at the merging portion W to the outside of the mold.

In the description of the embodiments, the pin 10 that is the gas drainage pin E and has the gas drainage function protrudes in the cavity C of the injection molding die D, and can slide back to the original position after the protrusion. The gas drainage pin E is not limited to those moving back and forth relative to the die, like the pin 10, but may be fixed to the die.

In the description of the embodiments, the pin 10 that is the gas drainage pin E and has the gas drainage function, has a columnar shape. Here, the gas drainage pin E is not limited to those having the columnar shape as the pin 10 has, but may have a rectangular column shape (e.g., a quadrangular prism shape).

In the description of the embodiments, a mechanism in which the molded article is protruded includes the ejector pin 20. Here, the mechanism in which the molded article is protruded is not limited to a case in which the ejector pin 20 is used, but a case in which a stripper plate and so on may be used.

The above description of the embodiments are all examples, and thus the present invention is not limited thereto. Various improvements and modifications without departing from the scope of the present invention can be applied.

REFERENCE SIGNS LIST

1 Protective cover
1A Fiber-reinforced synthetic resin main body
1B Metal annular body
2 Disc part
3 Cylindrical part
4 Sensor holder part
4A Sensor attachment hole
5 Separation wall
6 Magnetic sensor
7 Nut
7A Circumferential groove
8 Magnetic encoder
9 Support member
10 Pin having gas drainage function
11 Bearing
12 Inner ring
12A Inner ring raceway surface
13 Outer ring
13A Outer ring driving-raceway surface 14 Rolling elements
15 Seal member
16A Tiny burrs on outer periphery of gas drainage pin
16B Slot marks
17 Fixed die
18 Movable die
19 Support shaft
20 Ejector pin
A Bearing device
B Mounting bolt
C Cavity
D Injection molding die
E Gas drainage pin
F, G Protrusion direction
IB Inward
M Gas-drainage pin mark
OB Outward
P Molten resin material
W Weld (merging portion of molten resin material)

The invention claimed is:

1. A method of manufacturing a protective cover having a cup shape, the protective cover being mountable on a bearing device, the bearing device including:
   a bearing including: an inner ring having, on an outer peripheral surface thereof, an inner ring raceway surface; an outer ring having, on an inner peripheral surface thereof, an outer ring raceway surface; and a rolling element rolling between the inner ring raceway surface and the outer ring raceway surface;
   a magnetic encoder including N poles and S poles, which are alternately arranged at regular intervals in a circumferential direction, the magnetic encoder being located at an inward-side end portion of the bearing and fixed to the inner ring; and
   a magnetic sensor being opposed to magnetic poles of the magnetic encoder, for detecting rotation of the magnetic encoder,
   the protective cover being mounted to the outer ring so as to seal the inward-side end portion of the bearing,
   the protective cover comprising:
   a main body made of a fiber-reinforced synthetic resin; and
   a metal annular body,
   the main body and the metal annular body being integrally formed through insert injection molding of the fiber-reinforced synthetic resin with the metal annular body,
   the main body includes a disc part and a cylindrical part, which form the cup shape, and a sensor holder part protruding inward from the disc part,
   the fiber-reinforced synthetic resin being thermoplastic,
   the disc part having a separation wall which separates the magnetic encoder and the magnetic sensor from each other,
   the separation wall being made only of the fiber-reinforced synthetic resin, and having a thickness of 0.3 to 1.0 mm,
   the separation wall having a dimension larger than a dimension of a distal end of a gas drainage pin of an injection molding die used to make the main body, and
   the protective cover being molded using an injection molding die, the injection molding die including:
   a mechanism by which a molded article is protruded; and
   a gas drainage pin at a position where the separation wall is molded,
   the method comprising:
   an injection molding step of closing the injection molding die and injecting a molten resin material through a gate into a cavity of the injection molding die to solidify the molten resin material; and
   a molded-article taking out step of opening the injection molding die and protruding the protective cover that is the molded article, using the mechanism by which the molded article is protruded, so as to take the protective cover out.

2. The manufacturing method of a protective cover having a cup shape according to claim 1, wherein
   the gas drainage pin protrudes in the cavity of the injection molding die, and slidably moves back to an original position after the protrusion, and
   the gas drainage pin enters the cavity after the mechanism by which the molded article is protruded is operated, so as to be prevented from pressing the separation wall due to the entering.

3. The manufacturing method of a protective cover having a cup shape, according to claim 2, wherein
   the gas drainage pin provided at a position, in the injection molding die, where the separation wall is molded, is located at a merging portion of the molten resin material, the merging portion having been obtained by a resin fluidity analysis that has been previously performed.

4. The manufacturing method of a protective cover having a cup shape, according to claim 3, wherein
   the gas drainage pin provided at a position, in the injection molding die, where the separation wall is molded, is located at a merging portion of the molten resin material, the merging portion having been obtained by a resin fluidity analysis that has been previously performed.

5. A method of manufacturing a protective cover having a cup shape, the protective cover mountable on a bearing device, the bearing device including:
   a bearing including: an inner ring having, on an outer peripheral surface thereof, an inner ring raceway surface; an outer ring having, on an inner peripheral surface thereof, an outer ring raceway surface; and a rolling element rolling between the inner ring raceway surface and the outer ring raceway surface;
   a magnetic encoder including N poles and S poles, which are alternately arranged at regular intervals in a circumferential direction, the magnetic encoder being located at an inward-side end portion of the bearing and fixed to the inner ring; and
   a magnetic sensor being opposed to magnetic poles of the magnetic encoder, for detecting rotation of the magnetic encoder,
   the protective cover being mounted to the outer ring so as to seal the inward-side end portion of the bearing,
   the protective cover comprising:
   a disc part made of a synthetic resin; and
   a sensor holder part made of the synthetic resin and protruding inward from the disc part;
   the disc part having a separation wall which separates the magnetic encoder and the magnetic sensor from each other,
   the protective cover being molded using an injection molding die, the injection molding die including:
   a mechanism by which a molded article is protruded; and
   a gas drainage pin at a position where the separation wall is molded, the method comprising:
an injection molding step of closing the injection molding die and injecting a molten resin material through a gate into a cavity of the injection molding die to solidify the molten resin material; and
a molded-article taking out step of opening the injection molding die and protruding the protective cover that is the molded article, using the mechanism by which the molded article is protruded, so as to take the protective cover out, wherein:
the gas drainage pin protrudes in the cavity of the injection molding die, and slidably moves back to an original position after the protrusion, and
the gas drainage pin enters the cavity after the mechanism by which the molded article is protruded is operated, so as to be prevented from pressing the separation wall due to the entering.

6. A method of manufacturing a protective cover having a cup shape, for use in a bearing device, the bearing device including:
a bearing including: an inner ring having, on an outer peripheral surface thereof, an inner ring raceway surface; an outer ring having, on an inner peripheral surface thereof, an outer ring raceway surface; and a rolling element rolling between the inner ring raceway surface and the outer ring raceway surface;
a magnetic encoder including N poles and S poles, which are alternately arranged at regular intervals in a circumferential direction, the magnetic encoder being located at an inward-side end portion of the bearing and fixed to the inner ring; and
a magnetic sensor being opposed to magnetic poles of the magnetic encoder, for detecting rotation of the magnetic encoder,
the protective cover being mounted to the outer ring so as to seal the inward-side end portion of the bearing,
the protective cover comprising:
a disc part made of a synthetic resin; and
a sensor holder part made of the synthetic resin and protruding inward from the disc part;
the disc part having a separation wall which separates the magnetic encoder and the magnetic sensor from each other,
the protective cover being molded using an injection molding die, the injection molding die including:
a mechanism by which a molded article is protruded; and
a gas drainage pin at a position where the separation wall is molded,
the method comprising:
an injection molding step of closing the injection molding die and injecting a molten resin material through a gate into a cavity of the injection molding die to solidify the molten resin material; and
a molded-article taking out step of opening the injection molding die and protruding the protective cover that is the molded article, using the mechanism by which the molded article is protruded, so as to take the protective cover out, wherein
the gas drainage pin provided at a position, in the injection molding die, where the separation wall is molded, is located at a merging portion of the molten resin material, the merging portion having been obtained by a resin fluidity analysis that has been previously performed.

* * * * *